(12) United States Patent
Mizuo

(10) Patent No.: US 12,273,498 B2
(45) Date of Patent: Apr. 8, 2025

(54) CONTROL DEVICE

(71) Applicant: CANON KABUSHIKI KAISHA, Tokyo (JP)

(72) Inventor: Yoshihiro Mizuo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 164 days.

(21) Appl. No.: 18/163,373

(22) Filed: Feb. 2, 2023

(65) Prior Publication Data

US 2023/0254466 A1 Aug. 10, 2023

(30) Foreign Application Priority Data

Feb. 8, 2022 (JP) ................................ 2022-017805

(51) Int. Cl.
*H04N 13/128* (2018.01)
*G06F 3/04815* (2022.01)
*H04N 13/344* (2018.01)
*H04N 13/383* (2018.01)

(52) U.S. Cl.
CPC ....... *H04N 13/128* (2018.05); *G06F 3/04815* (2013.01); *H04N 13/344* (2018.05); *H04N 13/383* (2018.05)

(58) Field of Classification Search
None
See application file for complete search history.

(56) References Cited

U.S. PATENT DOCUMENTS

| 2008/0284864 | A1* | 11/2008 | Kotake | G06V 10/245 348/222.1 |
| 2016/0033770 | A1* | 2/2016 | Fujimaki | H04N 13/344 345/8 |
| 2016/0063764 | A1* | 3/2016 | Okamoto | G06T 11/60 345/633 |
| 2018/0045963 | A1* | 2/2018 | Hoover | G02B 27/0172 |
| 2019/0342632 | A1* | 11/2019 | DeFaria | G06T 15/20 |

FOREIGN PATENT DOCUMENTS

JP 2016-062593 A 4/2016

* cited by examiner

*Primary Examiner* — Clifford Hilaire
(74) *Attorney, Agent, or Firm* — Cowan, Liebowitz & Latman, P.C.

(57) ABSTRACT

A control device controls a display device so as to perform stereoscopic display in which a virtual object is disposed in a three-dimensional space, through right-eye display and left-eye display. The control device detects an object present in a field of vision of a user, in the three-dimensional space; detects a distance from the display device to the detected object; and controls the display device so as to perform the stereoscopic display, wherein a depth position of the virtual object is controlled by controlling a parallax of the virtual object between the right-eye display and the left-eye display, on a basis of a distance from the display device to a specific object that is present in a display direction of the virtual object, and that is an object closest to the display device.

18 Claims, 14 Drawing Sheets

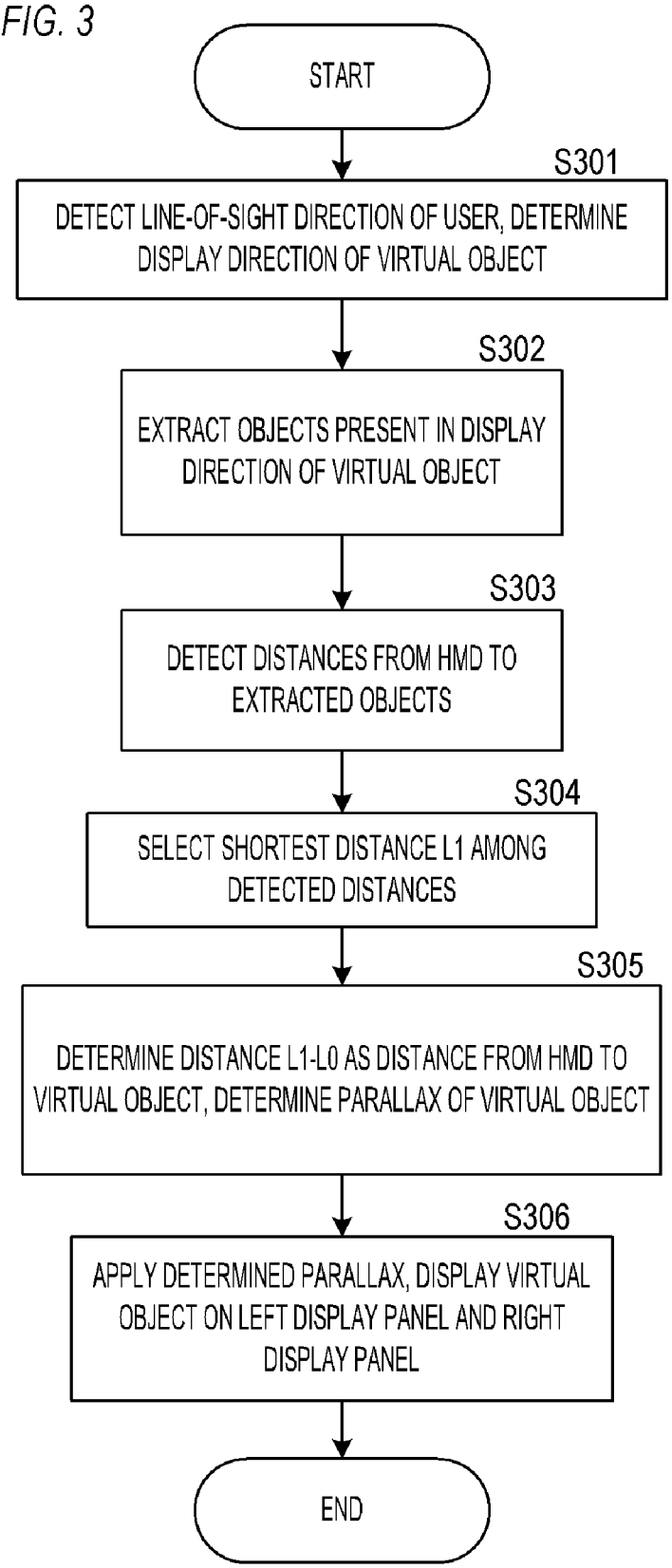

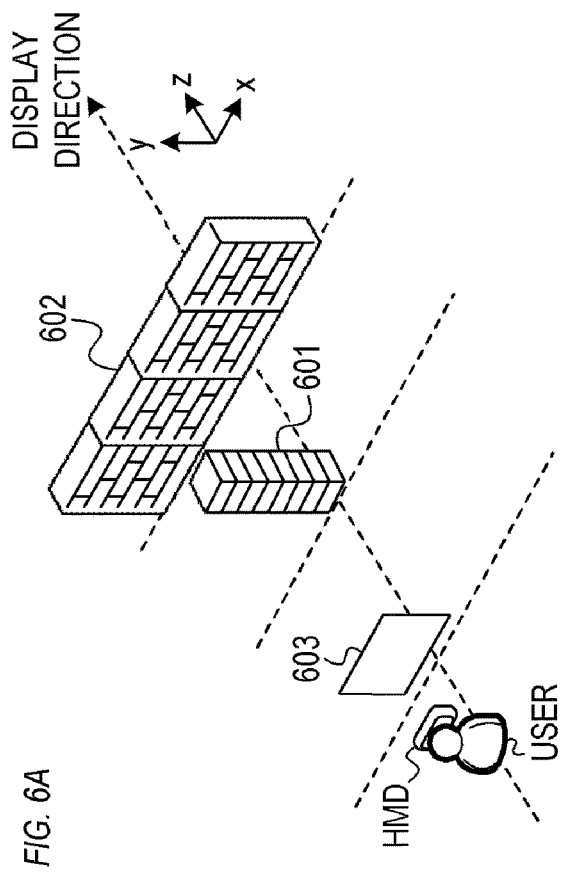
FIG. 6A
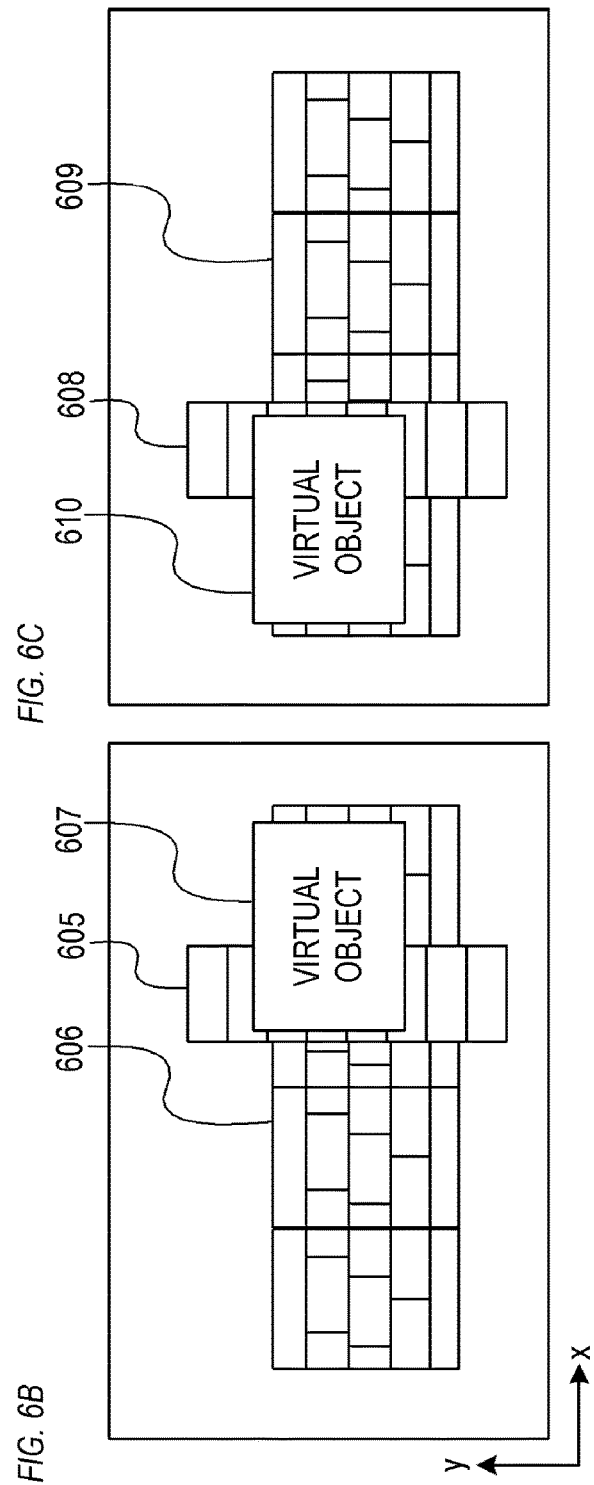
FIG. 6B
FIG. 6C

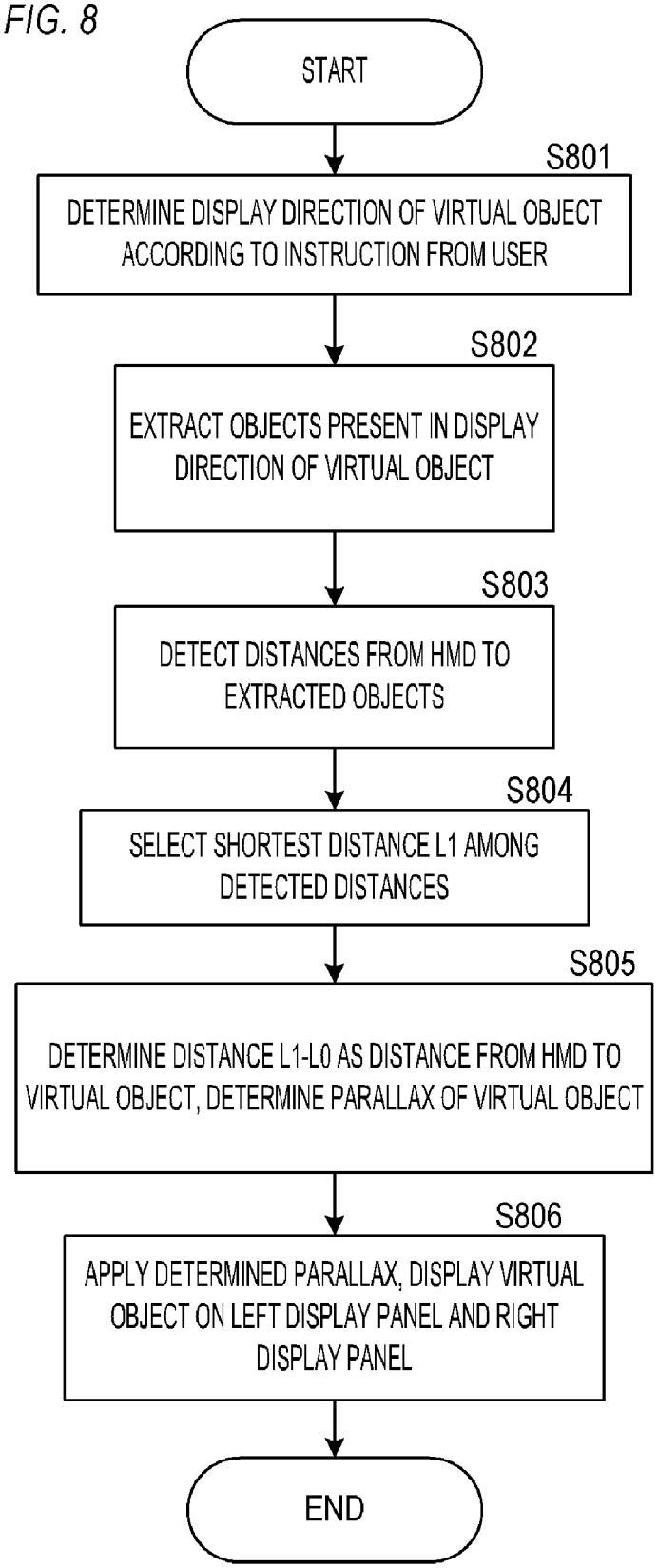

900

CONTROL DEVICE

BACKGROUND OF THE INVENTION

Field of the Invention

The present invention relates to a control device that controls a display device such as an HMD (head-mounted display).

Description of the Related Art

The spread of HMDs has been accompanied by advances in technologies for displaying combinations of real and virtual worlds. One such technology is referred to as XR (Cross Reality), which encompasses AR (Augmented Reality) and MR (Mixed Reality). Preferably, XR involves properly performing fusion display, for instance in accordance with the situation of the real world and the situation of a virtual world, so as not to elicit an awkward feeling in the user. Japanese Patent Application Publication No. 2016-62593 discloses a feature wherein a virtual object is not rendered at the back of a physical object, but only at the front of the physical object.

However, a virtual object the totality of whereof is to be preferentially displayed may fail to be displayed in the technology disclosed in Japanese Patent Application Publication No. 2016-62593.

SUMMARY OF THE INVENTION

The present invention provides a technique that allows displaying a virtual object without eliciting an awkward feeling in a user.

The present invention in its first aspect provides a control device configured to control a display device so as to perform stereoscopic display in which a virtual object is disposed in a three-dimensional space, through right-eye display and left-eye display, the control device including at least one memory and at least one processor which function as: an object detection unit configured to detect an object present in a field of vision of a user, in the three-dimensional space; a distance detection unit configured to detect a distance from the display device to the object detected by the object detection unit; and a control unit configured to control the display device so as to perform the stereoscopic display, wherein the control unit controls a depth position of the virtual object by controlling a parallax of the virtual object between the right-eye display and the left-eye display, on a basis of a distance from the display device to a specific object that is present in a display direction of the virtual object, and that is an object closest to the display device.

The present invention in its second aspect provides a control device including at least one memory and at least one processor which function as: a control unit configured to control a display device so as to perform stereoscopic display in which a virtual object is disposed in a three-dimensional space, through right-eye display and left-eye display, wherein in a case where the virtual object disposed at front of an object present in a field of vision of a user, in the three-dimensional space, the control unit controls the display device so as to perform the stereoscopic display in which the virtual object is disposed closer to the user in a case where a distance from the display device to the object is a first distance, than in a case where the distance is a second distance longer than the first distance.

The present invention in its third aspect provides a control method to control a display device so as to perform stereoscopic display in which a virtual object is disposed in a three-dimensional space, through right-eye display and left-eye display, the control method including: detecting an object present in a field of vision of a user, in the three-dimensional space; detecting a distance from the display device to the detected object; and controlling the display device so as to perform the stereoscopic display, wherein a depth position of the virtual object is controlled by controlling a parallax of the virtual object between the right-eye display and the left-eye display, on a basis of a distance from the display device to a specific object that is present in a display direction of the virtual object, and that is an object closest to the display device.

The present invention in its fourth aspect provides a non-transitory computer readable medium that stores a program, wherein the program causes a computer to execute a control method to control a display device so as to perform stereoscopic display in which a virtual object is disposed in a three-dimensional space, through right-eye display and left-eye display, the control method including: detecting an object present in a field of vision of a user, in the three-dimensional space; detecting a distance from the display device to the detected object; and controlling the display device so as to perform the stereoscopic display, wherein a depth position of the virtual object is controlled by controlling a parallax of the virtual object between the right-eye display and the left-eye display, on a basis of a distance from the display device to a specific object that is present in a display direction of the virtual object, and that is an object closest to the display device.

Further features of the present invention will become apparent from the following description of exemplary embodiments with reference to the attached drawings.

BRIEF DESCRIPTION OF THE DRAWINGS

FIG. 3 is a flowchart of virtual object display processing according to Embodiment 1;

FIG. 6A to FIG. 6C are diagrams illustrating comparative examples;

FIG. 8 is a flowchart of virtual object display processing according to Embodiment 2;

DESCRIPTION OF THE EMBODIMENTS

Embodiment 1

Embodiment 1 of the present invention will be explained next. In Embodiment 1 an instance will be explained in which the present invention is applied to a video see-through display (video see-through head-mounted display (HMD)). A video see-through display is a display in which a virtual space obtained through imaging of real space (outside world) is displayed in substantially real time. A user wearing a video see-through display cannot see real space directly, but can indirectly see the real space by looking at a displayed virtual space.

Figure 1A:
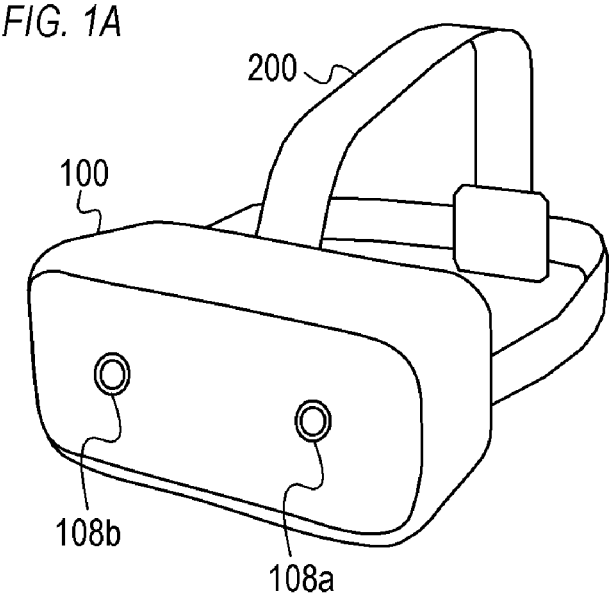
FIG. 1A and FIG. 1B are head-mounted external-view diagrams of a head-mounted display (HMD)
Figure 1B:
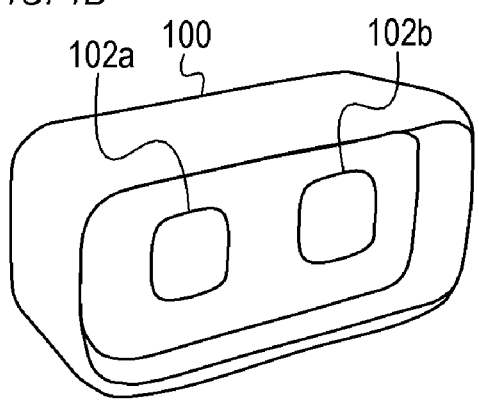

FIG. 1A and FIG. 1B are external-view diagrams of an HMD 100 according to Embodiment 1. As illustrated in FIG. 1A, the HMD 100 is provided with a headband 200. The user brings the HMD 100 to his/her eyes, and fixes the HMD 100 on his/her head using the headband 200. A left imaging device 108a is a camera that captures real space (outside world) for the purpose left-eye display while a right imaging device 108b is a camera that captures real space (outside world) for the purpose of right-eye display. A video image captured by the left imaging device 108a is displayed on a left display panel (not shown) which is visible through a left eyepiece 102a in FIG. 1B. A video image captured by the right imaging device 108b is displayed on a right display panel (not shown) which is visible through a right eyepiece 102b in FIG. 1B. The user aligns his/her left eye with the left eyepiece 102a, looks at the left display panel with the left eye, through the left eyepiece 102a, aligns his/her right eye with a right eyepiece 102b, and looks at the right display panel, with his/her right eye through the right eyepiece 102b.

Figure 2:
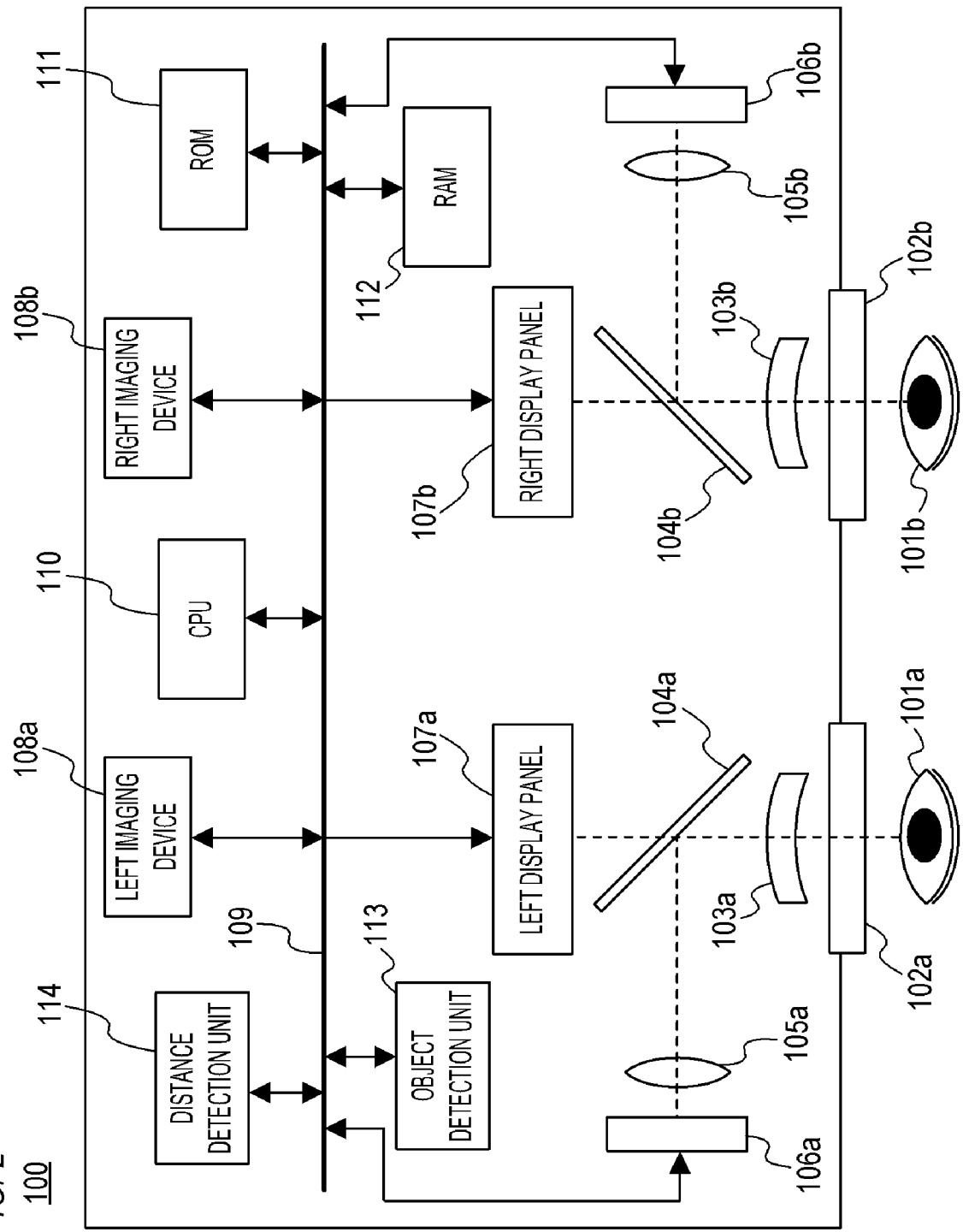
FIG. 2 is a block diagram illustrating the internal configuration of an HMD.

FIG. 2 is a block diagram illustrating the internal configuration of the HMD 100. Herein a left eye 101a denotes the user's left eye and a right eye 101b denotes the user's right eye.

A left eyepiece lens 103a is a lens for enlarging a video image displayed on a left display panel 107a, and a right eyepiece lens 103b is a lens for enlarging the video image displayed on a right display panel 107b. The user sees these enlarged video images.

A left light splitter 104a lets through light from the left display panel 107a (video image displayed on the left display panel 107a) and guides the light to the left eyepiece lens 103a. The left light splitter 104a reflects light from the left eyepiece lens 103a and the left eyepiece 102a (object light reflected by the left eye 101a and denoting the left eye 101a), and guides the light to a left light-receiving lens 105a. A right light splitter 104b lets through light from the right display panel 107b (video image displayed on the right display panel 107b), and guides the light to the right eyepiece lens 103b. The right light splitter 104b reflects light from the right eyepiece lens 103b and the right eyepiece 102b (object light reflected by the right eye 101b and denoting the right eye 101b), and guides the light to a right light-receiving lens 105b.

The left light-receiving lens 105a guides the light from the left light splitter 104a to a left imaging element 106a, while the right light-receiving lens 105b guides the light from the right light splitter 104b to a right imaging element 106b.

The left imaging element 106a photoelectrically converts light incident from the left light-receiving lens 105a. The left eye 101a is imaged as a result. The right imaging element 106b photoelectrically converts light incident from the right light-receiving lens 105b. The right eye 101b is imaged as a result. Video image data for the left eye 101a and video image data for the right eye 101b are sent to the necessary blocks via a bus 109.

The left display panel 107a displays the video image captured by the left imaging device 108a. The left display panel 107a may also display a video image resulting from superposition of an image of the virtual object onto the video image captured by the left imaging device 108a. The right display panel 107b displays the video image captured by the right imaging device 108b. The right display panel 107b may display a video image resulting from superposition of an image of the virtual object onto the video image captured by the right imaging device 108b. The HMD 100 can perform stereoscopic display, through right-eye display and left-eye display, in which the virtual object is disposed in a three-dimensional space (three-dimensional space centered on the HMD 100 (on the user wearing the HMD 100)).

The left imaging device 108a and the right imaging device 108b are spaced apart from each other by a gap corresponding to the spacing between the right and left eyes of a person. Two video images with parallax between the right eye and the left eye are captured by the left imaging device 108a and the right imaging device 108b.

The bus 109 is a bus for enabling exchange of data between blocks, and enables herein exchange of data between blocks connected to the bus 109.

A CPU 110 controls each block of the HMD 100 and executes various processes in the HMD 100. For instance, the CPU 110 can detect a line-of-sight direction (gaze direction) and/or line-of-sight position (gaze position) of the user, using images (user eye images) captured by the left imaging element 106a and the right imaging element 106b (line-of-sight detection, gaze detection). The CPU 110 can also control an object detection unit 113, to thereby detect (object detection) an object from video images (captured images) captured by the left imaging device 108a and the right imaging device 108b. The CPU 110 can also control a distance detection unit 114, to thereby detect (distance detection) the distance from the HMD 100 (from the user wearing the HMD 100) to an object.

A ROM 111 stores beforehand for instance processing programs that are executed by the CPU 110, and information necessary for processing. A RAM 112 stores video image data captured for instance by the left imaging element 106a, the right imaging element 106b, the left imaging device 108a and the right imaging device 108b. The RAM 112 is also used as a working memory that temporarily stores data required for processing by the CPU 110.

The object detection unit 113 detects (object detection) an object present in an image (in the field of vision of the user in three-dimensional space) that is captured by the left imaging device 108a and the right imaging device 108b. Through object detection, the object detection unit 113 can obtain information such as the position, type and size of the detected object. An instance will be explained next in which the position of the frontmost surface of the object is taken as the position of the object (virtual object or real object) but the definition of the position of the object is not particularly limited. For instance, a center position or a center of gravity position of the object may be used herein. Similarly, the definition of the position of HMD 100 is likewise not particularly limited.

The distance detection unit 114 detects (calculates) the distance from the HMD 100 to a detected object (object detected by the object detection unit 113) using a difference between the image captured by the left imaging device 108a and the image captured by the right imaging device 108b.

FIG. 3 is a flowchart of virtual object display processing according to Embodiment 1. For instance, the virtual object display processing is initiated (started) when higher-level software (program) determines that virtual object display processing on the virtual object display processing software (program) is to be executed, and a command to the effect of displaying the virtual object is issued from the upper software (program). Virtual object display processing may be initiated in response to an operation for starting the virtual object display process. The virtual object is for instance an information display frame that denotes information (operational caveats, warnings and so forth) that are to be notified at the timing of display.

In step S301 the CPU 110 detects a line-of-sight direction of the user utilizing images (images of the user's eyes) captured by the left imaging element 106a and the right imaging element 106b, and determines the line-of-sight direction as the display direction of the virtual object (direction in which the virtual object is to be displayed). The virtual object is not always displayed in the line-of-sight direction; herein the line-of-sight direction at the time of start of display of the virtual object is determined as the display direction of the virtual object. The user can look away from the virtual object after the virtual object has been displayed.

Figure 4A:
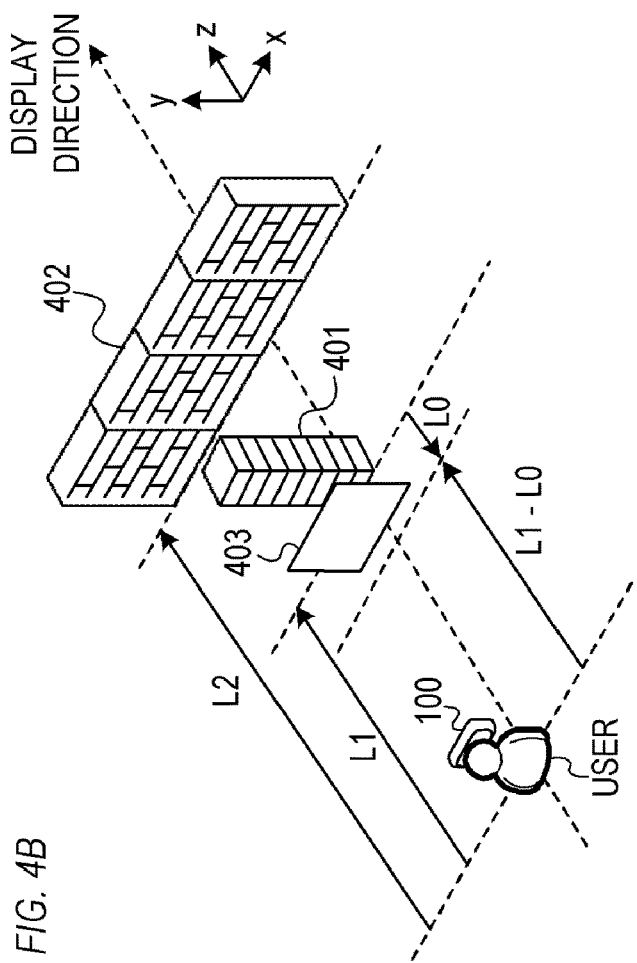
FIG. 4A and FIG. 4B are diagrams illustrating for instance the arrangement of a virtual object according to Embodiment 1.

In step S302 the CPU 110 extracts an object present in the display direction of the virtual object, from the objects detected by object detection unit 113. As an example, in a conceivable case the user visually recognizes a virtual object 403 at the position and with the size that are illustrated in FIG. 4A. In this case the virtual object 403 and a pillar 401 overlap in the display direction of the virtual object 403. The virtual object 403 and a wall 402 likewise overlap each other. Therefore, the pillar 401 and the wall 402 are extracted, as objects present in the display direction of the virtual object 403.

Figure 4B:
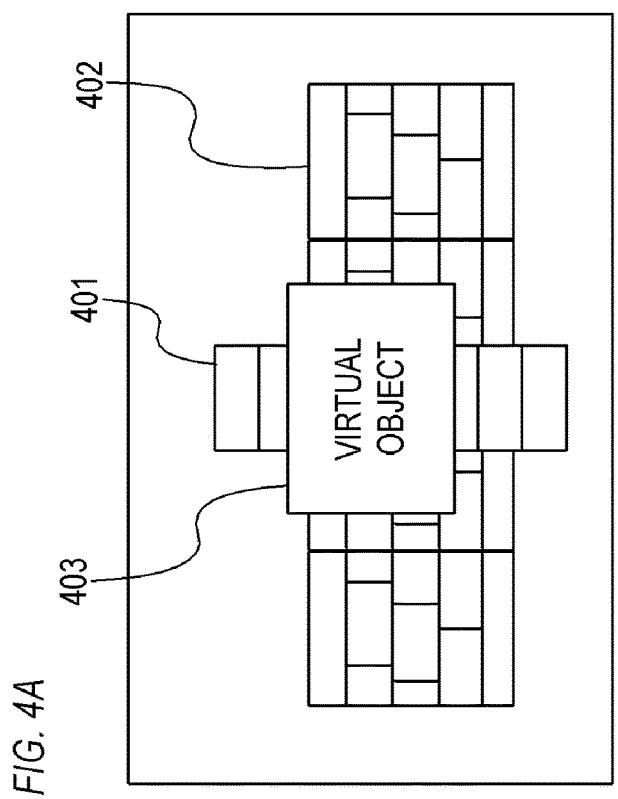

In step S303 the CPU 110 controls the distance detection unit 114, to detect the distances (distances in the display direction) from the HMD 100 to the objects extracted in step S302. For instance, the CPU 110 detects distances in the direction directly facing the HMD 100 (frontward direction of the HMD 100). Distances L1 and L2 illustrated in FIG. 4B are detected upon extraction of the pillar 401 and the wall 402 in FIG. 4A. The distance L1 is the distance from the HMD 100 to the pillar 401 and a distance L2 is the distance from the HMD 100 to the wall 402. The CPU 110 may detect distances in a direction parallel to the optical axes of the left imaging device 108a and the right imaging device 108b, or may detect distances in a direction from the HMD 100 towards the virtual object.

In step S304 the CPU 110 selects the shortest distance (distance from the HMD 100 to a specific object, being the closest object to the HMD 100 in the display direction of the virtual object) from among the distances detected in step S303. In the example of FIG. 4B, the distance L1 is selected since the distance L1 is shorter than the distance L2.

In step S305 the CPU 110 determines the distance from the HMD 100 to the virtual object on the basis of the distance selected in step S304. This processing can also be regarded as processing for determining a depth position (position in a depth direction) of the virtual object on the basis of the distance selected in step S304. The depth direction for the virtual object may be identical to the display direction of the virtual object, and for instance may be the frontward direction of the HMD 100, a direction parallel to the optical axis of the left imaging device 108a or the right imaging device 108b, or a direction pointing towards the virtual object from the HMD 100. The CPU 110 determines, as the depth position of the virtual object, a position, based on the distance selected in step S304, lying further to the front (closer to the HMD 100) than the specific object the distance to which has been selected in step S304. For instance, the CPU 110 determines a position at a predetermined distance frontward of the specific object, as the depth position of the virtual object. In the example of FIG. 4B, a distance L1-L0 is determined as the distance from the HMD 100 to the virtual object 403, and the virtual object 403 is disposed at a position frontward of the pillar 401 by a predetermined distance L0. As a result, the virtual object is disposed closer to the HMD 100 in a case where the distance from the HMD 100 to the specific object is a first distance, than in a case where the distance is a second distance longer than the first distance. Herein, the feature wherein the position of the virtual object stands close to the position of the HMD 100 signifies for instance that the position of the virtual object in the displayed three-dimensional space lies close to the position of the HMD 100 (of the user wearing the HMD 100) i.e. close to the center of the three-dimensional space.

In step S305 the CPU 110 determines a parallax (offset) of the virtual object between left-eye display (display on the left display panel 107a) and right-eye display (display on the right display panel 107b), on the basis of the distance from the HMD 100 to the virtual object.

Figure 5A:
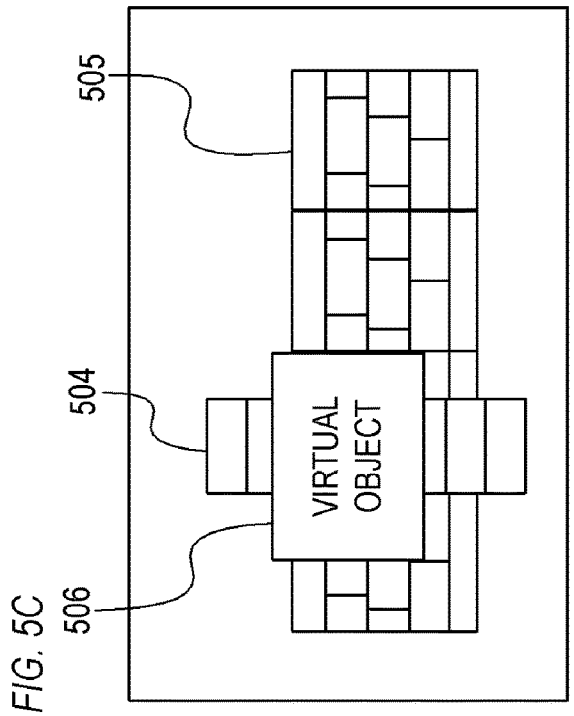
FIG. 5A to FIG. 5C are diagrams illustrating for instance parallax according to Embodiment 1.

The relationship between the distance to the object and the parallax of the object will be explained next with reference to FIG. 5A. In FIG. 5A, a left imaging element 507 is an imaging element in the left imaging device 108a, and a right imaging element 508 is an imaging element in the right imaging device 108b. An image of an object 509 is formed at a position 510 on the left imaging element 507 via an optical system of the left imaging device 108a, while an image of the object 509 is formed at a position 512 on the right imaging element 508 via an optical system of the right imaging device 108b. FIG. 5A illustrates also a position 511 on the right imaging element 508. The positional relationship between the right imaging element 508 and the position 511 is identical to the positional relationship between the left imaging element 507 and the position 510. A distance D between the positions 511 and 512 is the parallax, a distance F is the focal length of the imaging optical system, a distance B is the distance between the optical axis of the left imaging device 108a and the optical axis of the right imaging device 108b (distance between optical axes), and a distance Z is the distance from the HMD 100 to the object. A relational expression $Z=(B \times F)/D$ holds herein.

For instance, the CPU 110 calculates the parallax of the virtual object (corresponding to the distance Z) between left-eye display and right-eye display, using the above relational expression $Z=(B \times F)/D$. The distance from the HMD 100 to the virtual object corresponds to the distance Z, while a distance based on the center-to-center distance between the two imaging systems and the center-to-center distance between the two display systems, established beforehand as per the specifications of the HMD 100, corresponds to the distance B between the optical axes. The focal lengths of the left eyepiece lens 103a and the right eyepiece lens 103b correspond to the focal length F. Accordingly, the parallax of the virtual object between left-eye display and right-eye display can be determined on the basis of the above information items.

In step S306 the CPU 110 displays the virtual object on the left display panel 107a and the right display panel 107b, with applied parallax as determined in step S305 (stereoscopic display in which the virtual object is disposed in a three-dimensional space). On the left display panel 107a there is displayed an image of the virtual object superimposed on the video image captured by the left imaging device 108a, while on the right display panel 107b there is displayed an image of the virtual object superimposed on the video image captured by the right imaging device 108b. In the HMD 100 the depth position of the virtual object is controlled through control of the parallax (offset) of the virtual object. For instance, the virtual object is displayed while the parallax that has been determined is reflected; as a result, the virtual object can be made visible to the user as if the virtual object were disposed at the determined depth position.

Figure 5B:
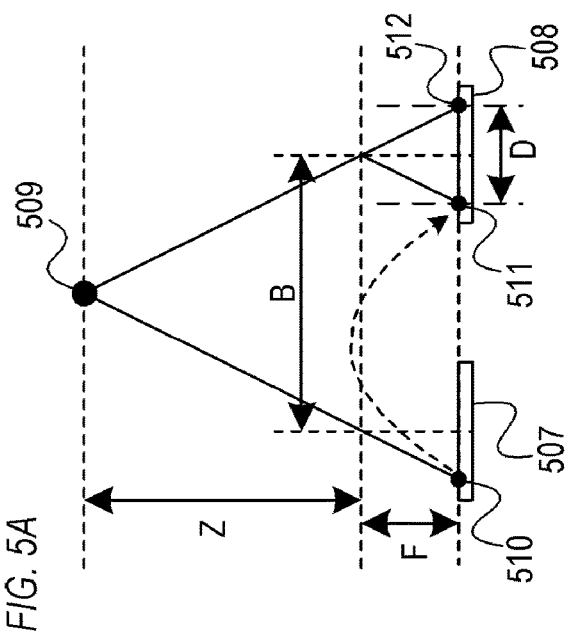

FIG. 5B illustrates an example of display on the left display panel 107a. A pillar 501, a wall 502 and a virtual object 503 are displayed on the left display panel 107a. The pillar 501 corresponds to the pillar 401 in FIG. 4A and FIG. 4B, the wall 502 corresponds to the wall 402, and the virtual object 503 corresponds to the virtual object 403. The distance from the HMD 100 to the pillar 501 is shorter than the distance from the HMD 100 to the wall 502, and accordingly the pillar 501 is displayed further to the right (than the wall 502). The virtual object 503 is displayed further to the right than the pillar 501 so that the virtual object 503 is disposed at the front of the pillar 501.

Figure 5C:
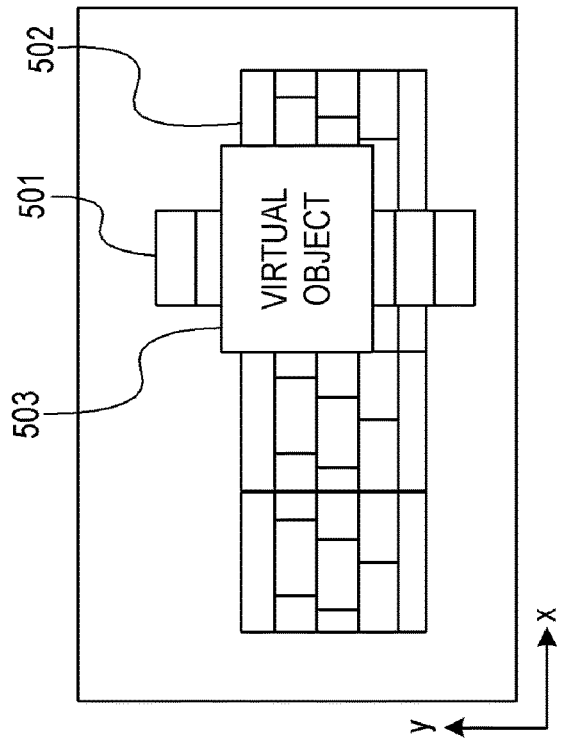

FIG. 5C illustrates an example of display on the right display panel 107b. A pillar 504, a wall 505 and a virtual object 506 are displayed on the right display panel 107b. The pillar 504 corresponds to the pillar 401 in FIG. 4A and FIG. 4B, the wall 505 corresponds to the wall 402, and the virtual object 506 corresponds to the virtual object 403. The distance from the HMD 100 to the pillar 504 is shorter than the distance from the HMD 100 to the wall 505, and hence the pillar 504 is displayed further to the left (than the wall 505). The virtual object 506 is displayed further to the left than the pillar 504 so that the virtual object 506 is disposed at the front of the pillar 504.

The virtual object can be displayed, without causing an awkward feeling in the user, as a result of the virtual object display processing of FIG. 3.

An example (comparative example versus Embodiment 1) will be explained next, with reference to FIG. 6A to FIG. 6C, in which the virtual object display processing of FIG. 3 is not performed. Arrangement of other objects at the front of the virtual object 603 can be suppressed herein in accordance with a simple method in which, as illustrated in FIG. 6A, a sufficiently (more than necessary) large value is set as the parallax of a virtual object 603, and in which the virtual object 603 is disposed sufficiently (more than necessary) in the foreground. In FIG. 6A, a pillar 601 is present at the front of a wall 602, and the virtual object 603 is disposed at the front of the pillar 601. The positional relationship between the pillar 601, the wall 602, and the HMD is identical to the positional relationship between the pillar 401, the wall 402, and the HMD 100 in FIG. 4B.

FIG. 6B illustrates an example of left-eye display. In left-eye display there are displayed a pillar 605, a wall 606 and a virtual object 607. The pillar 605 corresponds to the pillar 601 in FIG. 6A and the pillar 501 in FIG. 5B, the wall 606 corresponds to the wall 602 in FIG. 6A and the wall 502 in FIG. 5B, and the virtual object 607 corresponds to the virtual object 603 in FIG. 6A. The pillar 605 is displayed similarly to the pillar 501, and the wall 606 is displayed similarly to the wall 502. However, the virtual object 607 is displayed further to the right than the virtual object 503 in FIG. 5B, in order to arrange the virtual object 607 sufficiently (more than necessary) at the front of the pillar 605.

FIG. 6C illustrates an example of right-eye display. In right-eye display there are displayed a pillar 608, a wall 609 and a virtual object 610. The pillar 608 corresponds to the pillar 601 in FIG. 6A and the pillar 504 in FIG. 5C, the wall 609 corresponds to the wall 602 in FIG. 6A and the wall 505 in FIG. 5C, and the virtual object 610 corresponds to the virtual object 603 in FIG. 6A. The pillar 608 is displayed similarly to the pillar 504, and the wall 609 is displayed similarly to the wall 505. However, the virtual object 610 is displayed further to the left than the virtual object 506 in FIG. 5C, in order to arrange the virtual object 610 sufficiently (more than necessary) at the front of the pillar 608.

Other objects can be prevented from being disposed at the front of the virtual object, also by resorting to such a simple method. In order to see a virtual object disposed in the foreground more than necessary, however, the user needs to increase the angle of convergence formed by the lines of sight of the left and right eyes (i.e. to cross his/her eyes), using his/her eye muscles. This use of eye muscles is tiresome to the user. Accordingly, the above simple method tires out the user more readily than the method according to Embodiment 1 (virtual object display processing in FIG. 3).

Figure 7B:
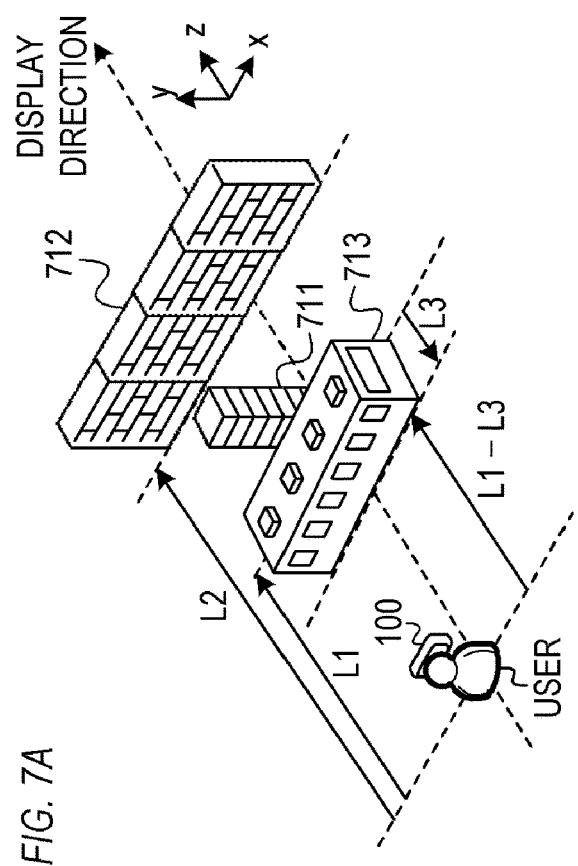
FIG. 7A and FIG. 7B are diagrams illustrating variations.
Figure 7A:
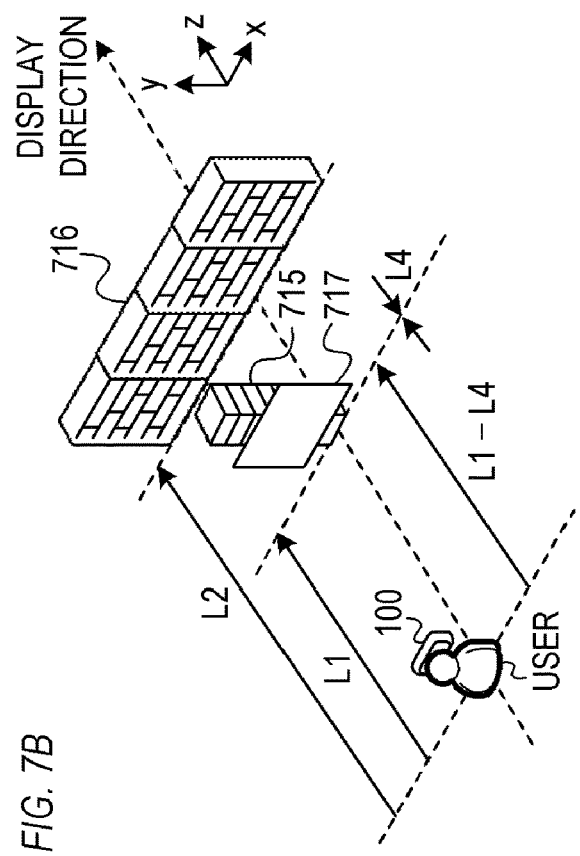

An example has been explained in which a position at the predetermined distance L0 at the front of the specific object is determined as the depth position of the virtual object, but the present invention is not limited thereto. For instance, the depth position of the virtual object may be determined on the basis of the distance from the HMD 100 to the specific object and on the basis of features of the virtual object. Features of the virtual object include for instance depth length (length in the depth direction). For instance, a position further to the front of the frontmost surface of the specific object, by the depth length of the virtual object, may be determined as the depth position of the frontmost surface of the virtual object. FIG. 7A and FIG. 7B illustrate examples (variations) of the arrangement of a virtual object. In FIG. 7A, a virtual object 713 is disposed at the front of a pillar 711 and a wall 712. The virtual object 713 is a virtual train, such that a depth length L3 of the virtual object 713 is larger than zero. In this case however the virtual object 713 subsides into the pillar 711 when the position lying at a certain distance, shorter than the depth length L3, at the front of the frontmost surface the pillar 711 is determined as the position of the frontmost surface of the virtual object 713. The virtual object 713 can be arranged, so as not to subside into the pillar 711, by determining a position lying at the front of the frontmost surface of the pillar 711 by the depth length L3, as the position of the frontmost surface of the virtual object 713. In FIG. 7B a virtual object 717 is disposed at the front of a pillar 715 and a wall 716. The virtual object 717 is a virtual poster, with a depth length L4 of the virtual object 717 being substantially zero. By determining a position lying at the front of the frontmost surface of the pillar 715 by the depth length L4 as the position of the frontmost surface of the virtual object 717, the virtual object 717 can be disposed as if affixed to the pillar 715.

A position lying at the front of the specific object by a distance resulting from reducing, by a predetermined proportion Ratio 1 higher than 0 and lower than 1, the distance from the HMD 100 to the specific object, may be determined as the depth position of the virtual object. A distance resulting from reducing, by a predetermined proportion Ratio 2 (=1−Ratio 1), the distance from the HMD 100 to the specific object, may be determined as the distance from the HMD 100 to the virtual object.

An example has been explained in which the distance from the HMD 100 to a detected object (the object detected by the object detection unit 113) is detected using a difference between the image captured by the left imaging device 108*a* and the image captured by the right imaging device 108*b*, but the distance detection method is not limited thereto. For instance, image plane phase difference information may be acquired, and the distance may be detected (calculated), using the image plane phase difference information. The distance may be detected for instance in accordance with a method referred to as LiDAR (light detection and ranging). For instance, there may be measured a lapse of time from emission of a laser beam until the beam is reflected by an object and returns, whereupon the distance to the object is detected (calculated) using the measured time.

An example has been explained in which the line-of-sight direction at the time where display of the virtual object is initiated is determined as the display direction of the virtual object, but the display direction of the virtual object is not limited thereto. For instance, the display direction of virtual objects may be determined beforehand for each virtual object. The display direction of a virtual object may be determined in accordance with other methods.

An example has been explained in which the present invention is applied to a video see-through display (video see-through HMD), but the display devices to which the present invention can be applied are not limited to video see-through displays. For instance, the present invention can also be applied to HMDs that display video images in virtual space unrelated to real space. The present invention can also be applied to optical see-through displays (optical see-through HMDs). An optical see-through display has for instance lenses similar to those of ordinary eyeglasses, such that an image of a virtual object is projected onto the lenses. A user wearing an optical see-through display can see real space directly through the lenses. Moreover, the user can also see a virtual object projected onto the lenses. The virtual object is arranged, in real space, with parallax applied between the projection position on the right-eye lens and the projection position on the left-eye lens.

An example has been explained which the present invention is applied to a display device, but the present invention can be applied to various control devices that control display devices. For instance, the present invention can be used in controllers, personal computers (PCs) or the like that are separate from a display device.

Embodiment 2

Embodiment 2 of the present invention will be explained next. Explanations pertaining to features (configuration and processing) identical to those of Embodiment 1 may be omitted as appropriate.

FIG. 8 is a flowchart of virtual object display processing according to Embodiment 2. For instance, virtual object display processing is initiated when a command to display the virtual object is issued from higher-level software, similarly to Embodiment 1.

Figure 9:
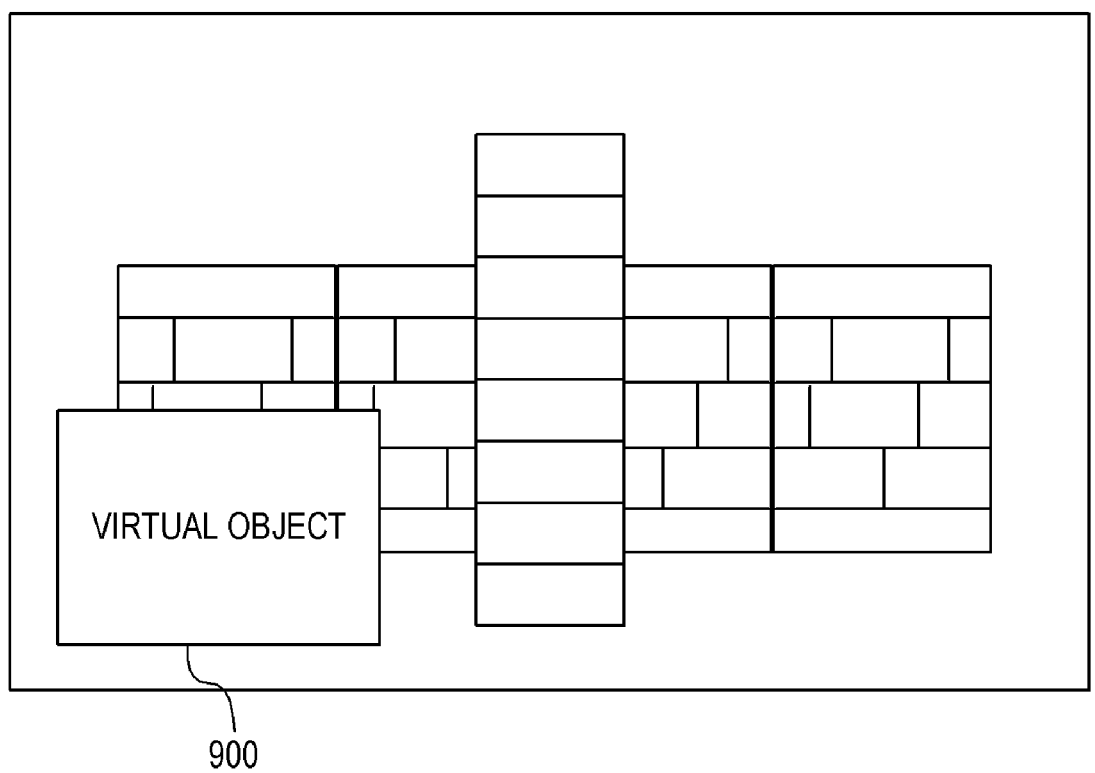
FIG. 9 is a diagram illustrating for instance the arrangement of a virtual object according to Embodiment 2.

In step S801 the CPU 110 determines the display direction of the virtual object. For instance, a display direction command is issued from higher-level software and the CPU 110 determines the display direction in accordance with that command. The display direction may be a preset direction, or may be a direction designated by the user. In Embodiment 2, the display direction of the virtual object is a direction that does not depend on the line-of-sight direction; for instance, a virtual object 900 is disposed at the lower left of the field of vision, as illustrated in FIG. 9. Steps S802 to S806 are identical to steps S302 to S306 in Embodiment 1 (FIG. 3).

As a result of the virtual object display processing of FIG. 8 the virtual object can be displayed would eliciting an awkward feeling in the user, even when the display direction the virtual object is designated regardless of the line-of-sight direction.

Embodiment 3

Embodiment 3 of the present invention will be explained next. An explanation pertaining to features (configuration and processing) identical to those of Embodiment 1 may be omitted as appropriate.

Figure 10:
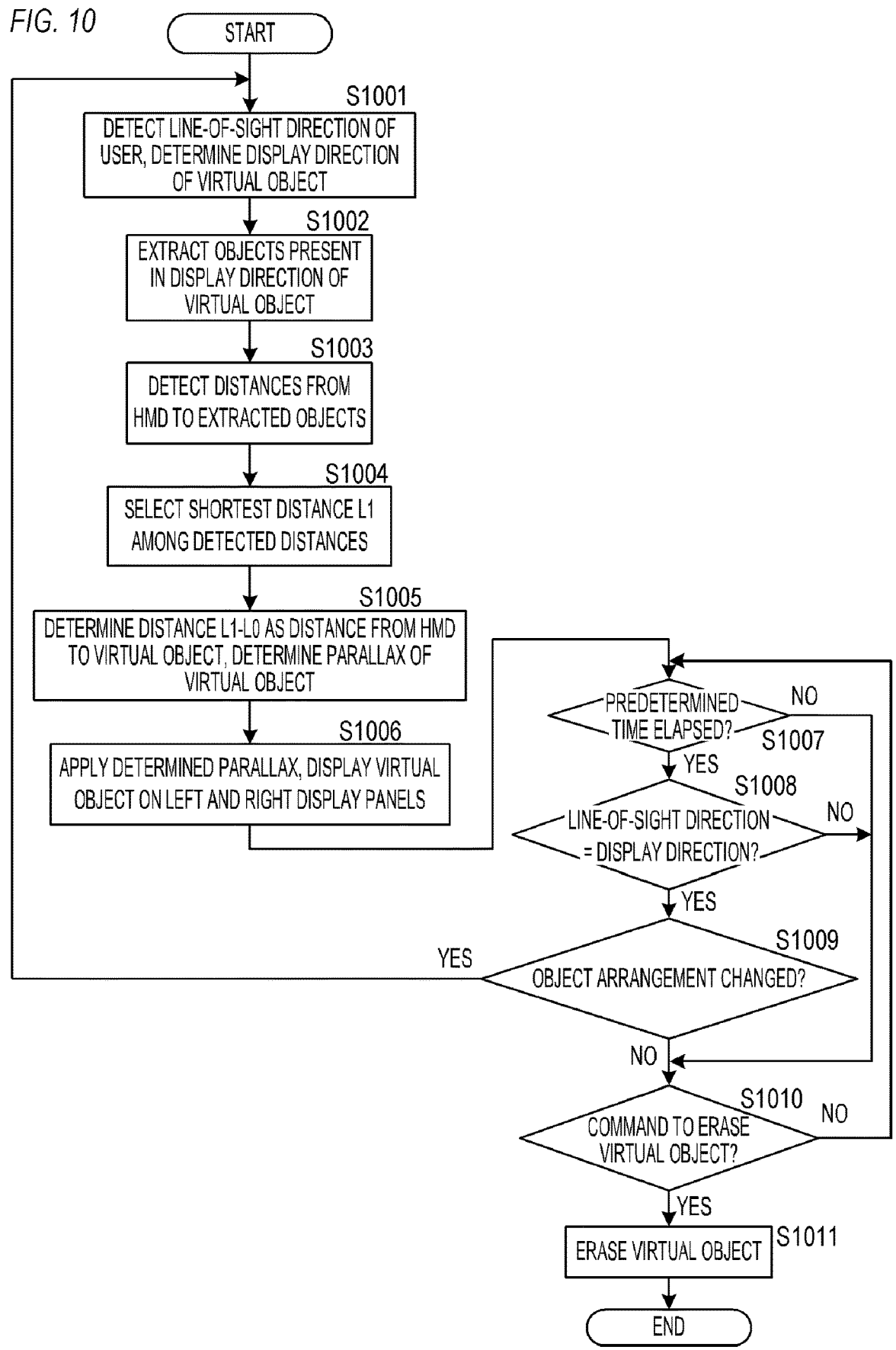
FIG. 10 is a flowchart of virtual object display processing according to Embodiment 3.

FIG. 10 is a flowchart of virtual object display processing according to Embodiment 3. For instance, virtual object display processing is initiated when a command to display the virtual object is issued from higher-level software, similarly to Embodiment 1.

Steps S1001 to S1006 are identical to steps S301 to S306 in Embodiment 1 (FIG. 3).

In step S1007 the CPU 110 determines whether a predetermined lapse of time has elapsed or not after execution of the process in step S1006. This predetermined lapse of time is a period for determining whether or not to update the display of the virtual object. In a case where the CPU 110 determines that the predetermined lapse of time has elapsed, the process proceeds to step S1008, whereas in a case where the CPU 110 determines that the predetermined time has not elapsed, the process proceeds to step S1010.

In step S1008 the CPU 110 determines whether the line-of-sight direction of the user points or not, in the display direction of the virtual object (whether the line-of-sight direction matches the display direction or not). In a case where the CPU 110 determines that the line-of-sight direction of the user points in the display direction of the virtual object, the process proceeds to step S1009, whereas if the CPU 110 determines that the line-of-sight direction does not point in the display direction, the process proceeds to step S1010.

In step S1009 the CPU 110 determines whether the arrangement of the object has changed or not in the display direction of the virtual object. In a case where the CPU 110 determines that the arrangement of the object has changed, the process proceeds to step S1001, whereas in a case where the CPU 110 determines that the arrangement of the object has not changed, the process proceeds to step S1010. When for instance the user moves to the left. In FIG. 4B without a change in the orientation of his/her face (frontward direction of the HMD 100), the pillar 401 moves to the right, with the virtual object 403 remaining at the center of the field of vision, such that the virtual object 403 does not overlap the pillar 401. In such a case the process proceeds to step S1001. The position of the virtual object 403 is then updated so that the virtual object 403 becomes disposed at a position lying at the front of the wall 402 by the predetermined distance L0.

In step S1010 the CPU 110 determines whether an instruction to erase the virtual object has been received or not. For instance when the user performs, on an operation unit, an operation for erasing the virtual object, the operation unit sends a command to erase the virtual object to the CPU 110. In case where the CPU 110 determines that it has received a command to erase the virtual object, the process proceeds to step S1011, whereas in a case where the CPU 110 determines that it has not received a command to erase the virtual object, the process proceeds to step S1007.

In step S1011 the CPU 110 erases the virtual object from the display on left display panel 107a and from the display on the right display panel 107b.

The virtual object can be displayed, without causing an awkward feeling in the user, as a result of the virtual object display processing of FIG. 10. The position of the virtual object can be suitably updated for instance at a timing where the arrangement of the object or the orientation of the HMD 100 changes, or at a timing where the user looks at the virtual object (timing at which the user focuses on the virtual object). For instance, it becomes possible to suppress increases in processing load derived from unnecessary updating processing of the position of the virtual object.

An example of control of the depth position of the virtual object in a case where the two conditions below are both satisfied has been explained. That is, an example has been explained in which a predetermined condition for controlling the depth position of the virtual object includes the two conditions below. However, the predetermined condition for controlling the depth position of the virtual object is not limited thereto. For instance, the depth position of the virtual object may be controlled even if one of the two conditions below is not satisfied. That is, the predetermined condition for controlling the depth position of the virtual object need not include one of the two conditions below.

Condition to the effect that the line-of-sight direction of the user points in the display direction of the virtual object (step S1008)

Condition to the effect that the arrangement of an object in the display direction of the virtual object has changed (step S1009)

Embodiment 4

Embodiment 4 of the present invention will be explained next. An explanation pertaining to features (configuration and processing) identical to those of Embodiments 1 and 3 may be omitted as appropriate.

Figure 11:
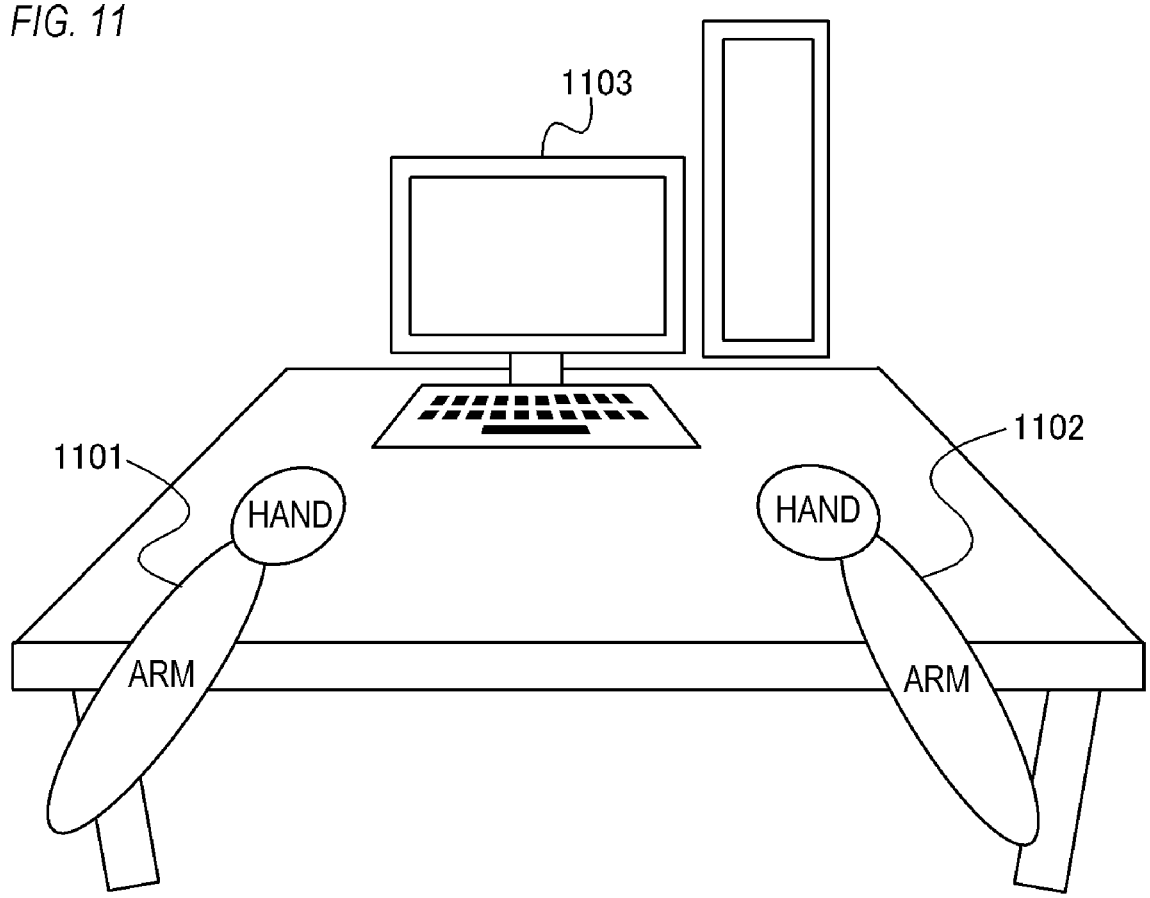
FIG. 11 is a diagram illustrating a situation according to Embodiment 4.

FIG. 11 is a diagram illustrating a situation envisaged in Embodiment 4, and that depicts the field of vision of a user who is doing desk work while sitting in front of a desk on which a PC is placed. A left arm 1101, a right arm 1102 and a PC 1103 are represented as main elements.

Figure 12:
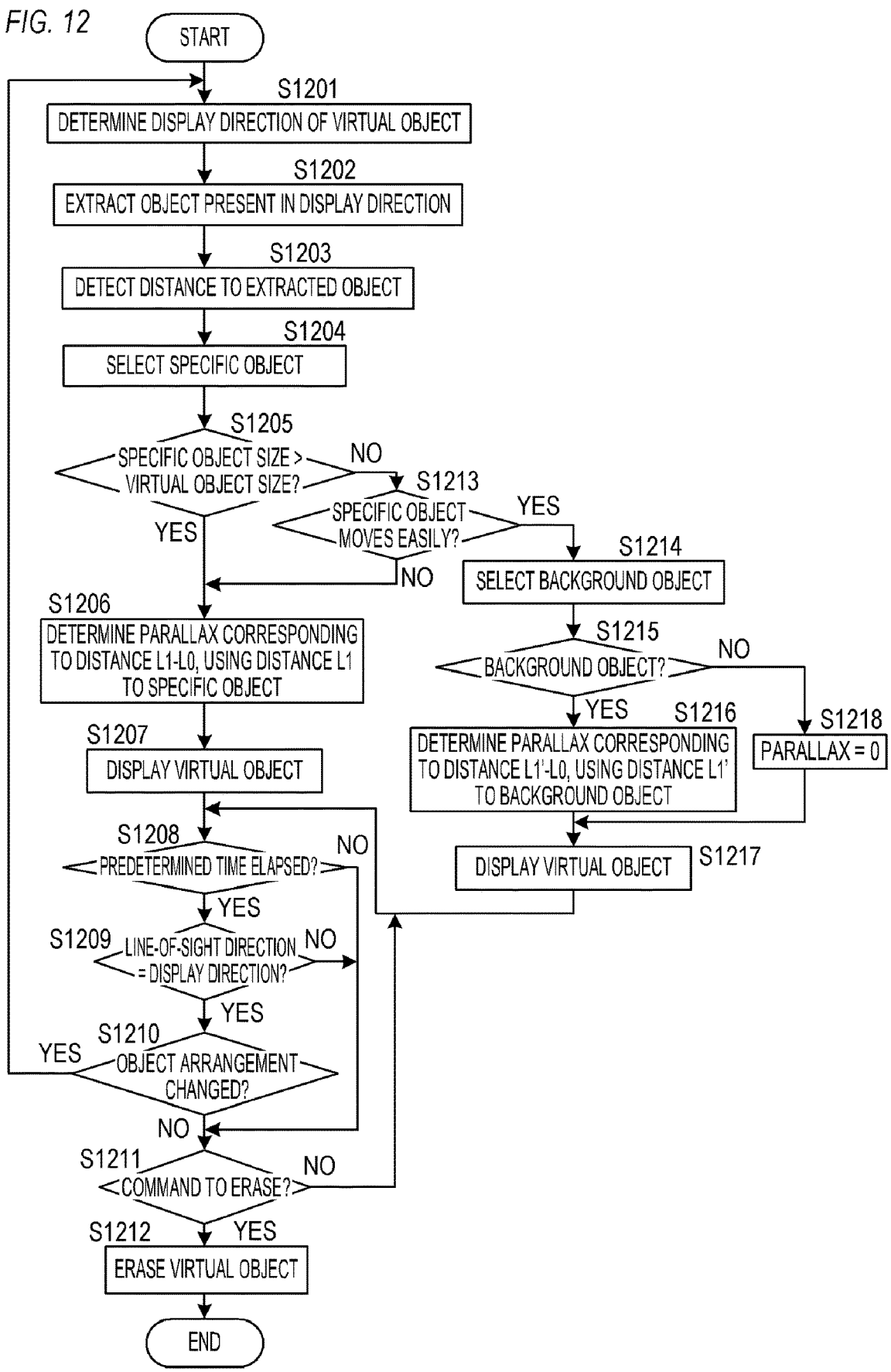
FIG. 12 is a flowchart of virtual object display processing according to Embodiment 4.

FIG. 12 is a flowchart of virtual object display processing according to Embodiment 4. For instance, virtual object display processing is initiated when a command to display the virtual object is issued from higher-level software, similarly to Embodiment 1.

Steps S1201 to S1203 are identical to steps S301 to S303 in Embodiment 1 (FIG. 3).

In step S1204 the CPU 110 selects an object corresponding to the shortest distance from among the distances detected in step S1203 (selects the specific object being an object that is present in the display direction of the virtual object from the HMD 100 and that is closest to the HMD 100).

In step S1205 the CPU 110 determines whether or not the visible size of the specific object is larger than the visible size of the virtual object (whether or not the visible size of the virtual object is smaller than the visible size of the specific object). The visible size is a size that the user can visually recognize; in Embodiment 4, the visible size is the size (display size; number of pixels) on a display surface of the left display panel 107a or the right display panel 107b. In a case where the CPU 110 determines that the visible size of the specific object is larger than the visible size of the virtual object (the visible size of the virtual object is smaller than the visible size of the specific object), the process proceeds to S1206; else, the process proceeds to step S1213. In a case where the CPU 110 determines that the visible size of the specific object is equal to the visible size of the virtual object, the process may proceed to step S1206.

An example of processing in steps S1204 and S1205 will be explained with reference to FIG. 13A to FIG. 13C and FIG. 14A to FIG. 14C.

Figure 13A:
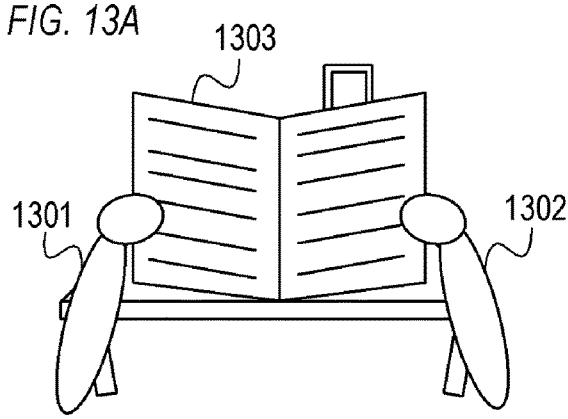
FIG. 13A to FIG. 13F are diagrams illustrating situations and processing according to Embodiment 4.
Figure 13B:
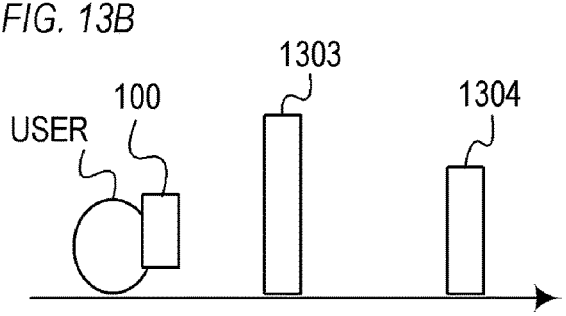
Figure 13C:
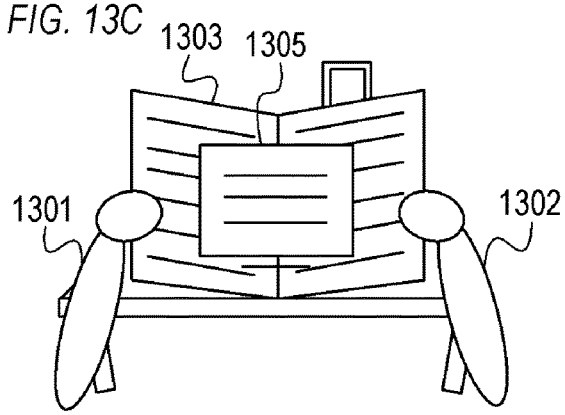

In FIG. 13A the user is holding a spread newspaper 1303 with his/her left arm 1301 and right arm 1302. FIG. 13B is a schematic diagram of the situation in FIG. 13A viewed from a side of the user. The direction of the arrow in FIG. 13B is the line-of-sight direction of the user, and also the depth direction from the user (frontward direction of the HMD 100). As illustrated in FIG. 13B, the newspaper 1303 is positioned at the front of a PC 1304. In this situation, the newspaper 1303 is selected, in step S1204, as the specific object. In step S1205 it is determined whether the visible size of the newspaper 1303 is larger or not than the visible size of the virtual object. The visible size of the newspaper 1303 is the size of the newspaper 1303 illustrated in FIG. 13A and FIG. 13C, and the visible size of the virtual object is the size of the virtual object 1305 illustrated in FIG. 13C. As illustrated in FIG. 13C, the visible size of newspaper 1303 is larger than the visible size of virtual object 1305. Accordingly, the process proceeds to step S1206.

Figure 14A:
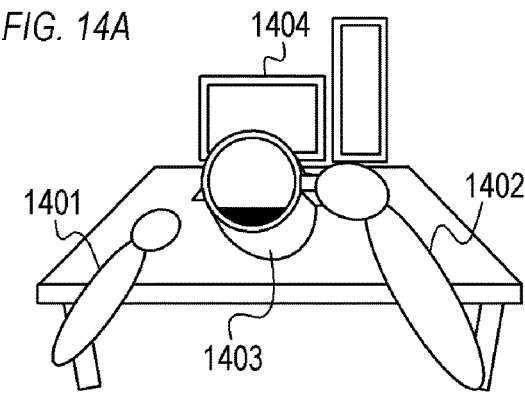
FIG. 14A to FIG. 14F are diagrams illustrating situations and processing according to Embodiment 4.
Figure 14B:
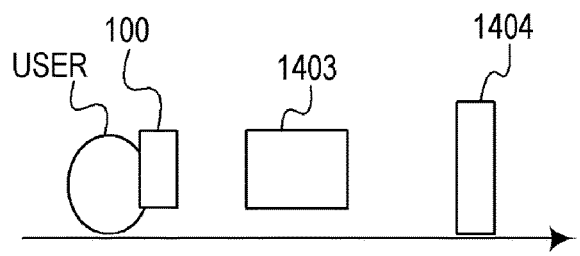
Figure 14C:
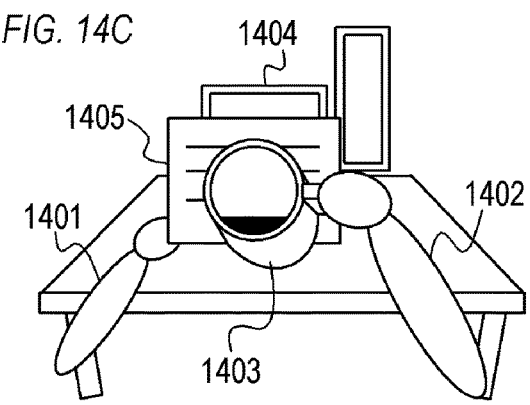

In FIG. 14A the user, who has nothing in his/her left arm 1401, is raising a mug 1403 to his/her mouth using with his/her right arm 1402. Herein the user can see the PC 1404 at the back of the mug 1403. FIG. 14B is a schematic diagram of the situation in FIG. 14A viewed from a side of the user. The direction of the arrow in FIG. 14B is the line-of-sight direction of the user, and also the depth direction from the user (frontward direction of the HMD 100). As illustrated in FIG. 14B, the mug 1403 is positioned at the front of the PC 1404. In this situation, the mug 1403 is selected as the specific object in step S1204. In step S1205 it is determined whether the visible size of the mug 1403 is larger than the visible size of the virtual object or not. The visible size of the mug 1403 is the size of the mug 1403 illustrated in FIG. 14A and FIG. 14C, and the visible size of the virtual object is the size of a virtual object 1405 illustrated in FIG. 14C. As illustrated in FIG. 14C, the visible size of the mug 1403 is smaller than the visible size of the virtual object 1405. Accordingly, the process proceeds to step S1213.

Step S1206 is identical to step S305 in Embodiment 1 (FIG. 3). In step S1206 the CPU 110 determines a distance L1-L0 from the HMD 100 to the virtual object, using distance L1 from the HMD 100 to the specific object, and the predetermined distance L0. In step S1206 the CPU 110 determines the parallax of the virtual object between left-eye display and right-eye display on the basis of the distance from the HMD 100 to the virtual object.

Figure 13D:
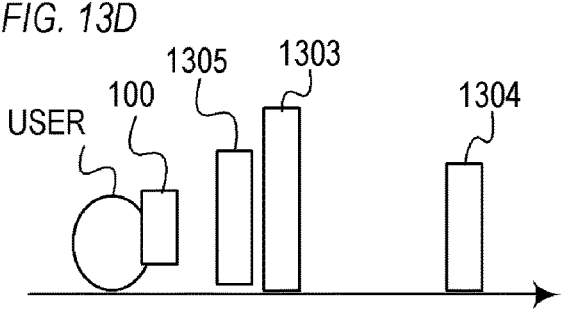

Step S1207 is identical to step S306 of Embodiment 1 (FIG. 3). In step S1207 the CPU 110 displays the virtual object on left display panel 107a and right display panel 107b, with the parallax determined in step S1206 applied thereto. For instance, the virtual object 1305 is disposed as illustrated in FIG. 13C and FIG. 13D. FIG. 13D is a schematic diagram of the situation of FIG. 13C viewed from a side of the user. As illustrated in FIG. 13D, the newspaper 1303 is positioned at the front of the PC 1304, and the virtual object 1305 is positioned at the front of the newspaper 1303. The visible size of the virtual object 1305 is smaller than the visible size of the newspaper 1303 and it is thus natural to arrange the virtual object 1305 at the front of the newspaper 1303; accordingly, this is done in Embodiment 4.

In step S1213 the CPU 110 determines whether or not the specific object is an easily movable object (an object that can be moved easily, such as a mug). For instance, the CPU 110 determines whether or not the specific object is held by a hand of the user, and whether or not the specific object is a hand of the user, using information about the type of the detected object and obtained through object detection performed by the object detection unit 113. The CPU 110 determines that the specific object is an easily movable object in a case for instance where the specific object is held by a hand of the user, or in a case where the specific object is a hand of the user. In a case where the CPU 110 determines that the specific object is an easily movable object, the process proceeds to step S1214, whereas in a case where the CPU 110 determines that the specific object is not an easily movable object, the process proceeds to step S1206. If the specific object is an object that cannot be easily moved, therefore, the depth position of the virtual object is controlled to a position further to the front than the specific object, similarly to Embodiment 1, even if the visible size of the virtual object is smaller than the visible size of the specific object.

In step S1214 the CPU 110 selects an object corresponding to the second shortest distance from among the distances detected in step S1203 (selects a background object being an object that is present in the display direction of the virtual object from the HMD 100 and that is the second object closest to the HMD 100). The background object can also be regarded as the object closest to a specific object from among objects that are present at the back of the specific object in the display direction of the virtual object.

In step S1215 the CPU 110 determines whether or not a background object has been selected in step S1214. For instance, no background object is selected in a case where no background object is present. In a case where the CPU 110 determines that a background object has been selected, the process proceeds to step S1216, whereas in a case where the CPU 110 determines that no background object has been selected, the process proceeds to step S1218.

In step S1216 the CPU 110 determines a distance L1'-L0 from the HMD 100 to the virtual object using a distance L1' from the HMD 100 to the background object, and the predetermined distance L0. This processing can also be regarded as processing for determining, as the depth position of the virtual object, a position at the predetermined distance L0 at the front of the background object. In step S1216 the CPU 110 determines the parallax of the virtual object between left-eye display and right-eye display, on the basis of the distance from the HMD 100 to the virtual object. The position at the front of the specific object is the depth position of the virtual object in a case where a difference (L1'-L1) between the distance L1 from the HMD 100 to the specific object and the distance L1' from the HMD 100 to the background object is shorter than the predetermined distance L0. In such a case, a distance shorter than the difference (L1'-L1) may be used instead of the predetermined distance L0. A sufficiently short distance may be used as the predetermined distance L0, so as to preclude the difference (L1'-L1) from being shorter than the predetermined distance L0.

In step S1218 the CPU 110 determines 0 as the parallax of the virtual object between left-eye display and right-eye display. This processing can also be regarded as processing for determining a position at infinity as the depth position of the virtual object. If no background object is present, there arises no distance mismatch (display in which the virtual object hides (covers) an object further to the front than the virtual object), even if the virtual object is disposed at a position at infinity.

If the visible size of the virtual object is not smaller than the visible size of the specific object, and the specific object is an object that can be easily moved, then a position at the back of the specific object is determined, in the processing in step S1216 or step S1218, as the depth position of the virtual object.

Figure 14D:
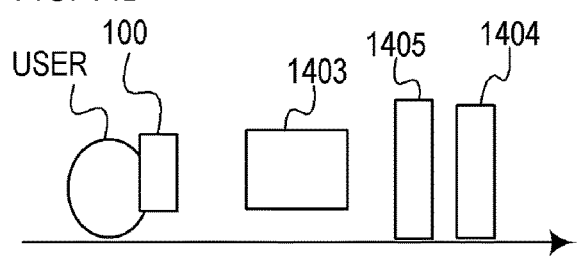

In step S1217 the CPU 110 displays the virtual object on the left display panel 107a and the right display panel 107b, with the parallax determined in step S1216 or step S1218 applied thereto. However, the CPU 110 does not render a region, in the virtual object, overlapped by the specific object in the display direction of the virtual object. For instance, the virtual object 1405 is disposed and rendered as illustrated in FIG. 14C. FIG. 14D is a schematic diagram of the situation in FIG. 14C viewed from a side of the user. As illustrated in FIG. 14D, the virtual object 1405 is positioned at the front of the PC 1404 and the mug 1403 is positioned at the front of the virtual object 1405. As illustrated in FIG. 14C, the virtual object 1405 is not rendered in the region of the mug 1403; instead, the virtual object 1405 is rendered avoiding the region of the mug 1403. As a result, this allows suppressing display (mismatch) in which the virtual object 1405 hides the mug 1403 further to the front than the virtual object 1405. It becomes moreover possible to suppress blocking of the field of vision of the user by the virtual object 1405 as the user brings the mug 1403 to his/her mouth. For instance, the user may spill the content of the mug 1403 in surprise when the field of vision is blocked by the virtual object 1405 as he/she brings the mug 1403 to his/her mouth.

Once processing in step S1207 or step S1217 has been carried out, the process proceeds to step S1208. Step S1208 to S1211 are identical to steps S1007 to S1011 in Embodiment 3 (FIG. 10).

An example of the processing in steps S1208 to S1211 will be explained next with reference to FIG. 13E and FIG. 13F, and FIG. 14E and FIG. 14F.

Figure 13E:
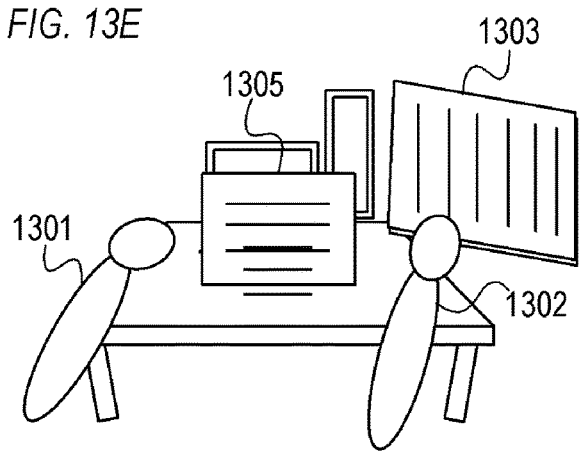
Figure 13F:
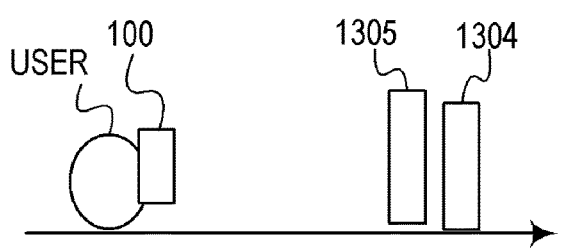

In FIG. 13E the user has moved the newspaper 1303 to a position at which the virtual object 1305 does not overlap the newspaper 1303. In this case it is determined, in step S1210, that the arrangement of the object in the display direction of the virtual object 1305 has changed, and the process proceeds to step S1201, whereupon the position of the virtual object 1305 is updated. The depth position of the virtual object 1305 is updated from the position illustrated in FIG. 13D (slightly at the front of the newspaper 1303) to the position illustrated in FIG. 13F (slightly at the front of the PC 1304). The depth position of the virtual object 1305 is updated, through a reduction in the parallax of the virtual object 1305, so that the virtual object 1305 recedes away. The burden on the user's eyes is thus eased through a reduction in the parallax of the virtual object 1305. The parallax of the virtual object 1305 may be instantaneously modified to a target value (parallax corresponding to a position slightly at the front of the PC 1304) in accordance with a determination to the effect that the arrangement of the object in the display direction of the virtual object 1305 has changed; alternatively, the parallax may be modified to a target value gradually. That is, the depth position of the virtual object 1305 may be controlled by being modified to a target position instantaneously, or by being modified to a target position gradually. When the parallax of the virtual object 1305 is modified gradually to a target value, the virtual object 1305 recedes gradually to a position slightly at the front of the PC 1304.

Figure 14E:
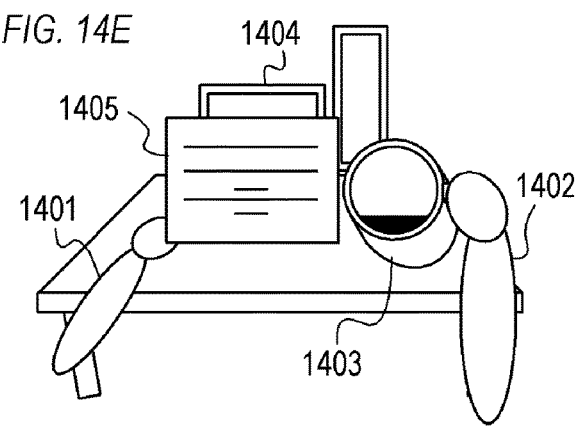
Figure 14F:
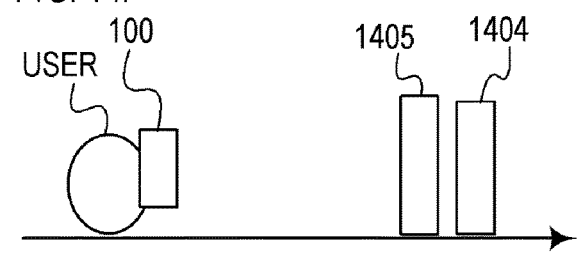

FIG. 14E illustrates a user moving the mug 1403 to a position at which the mug 1403 does not overlap the virtual object 1405. In this case it is determined, in step S1210, that the arrangement of the object in the display direction of the virtual object 1405 has changed, and the process proceeds to step S1201, whereupon the position of the virtual object 1405 is updated. Part of the virtual object 1405 was not displayed in FIG. 14C, but herein the entirety of the virtual object 1405 is displayed. This amounts to a natural operation in which, after the virtual object 1405 has appeared at the back of the mug 1403, the entire virtual object 1405 can be recognized by moving the mug 1403 away. As illustrated in FIG. 14F, the depth position of the virtual object 1405 exhibits no change from that illustrated in FIG. 14D. The burden on the user's eyes is thus reduced since the parallax of the virtual object 1405 is sufficiently small.

The virtual object can be displayed, without eliciting an awkward feeling in the user, as a result of the virtual object display processing of FIG. 12.

An example in which the visible size of a virtual object does not depend on the depth position of the virtual object has been illustrated above, but the virtual object may be set to appear smaller as the object recedes away, similarly to a real object. Different methods for controlling the visible size of the virtual object may be adopted depending on the type of virtual object. In the case of a first type, for instance, the visible size of the virtual object may be modified so that the virtual object looks smaller as it recedes away, whereas in the case of a second type, modification of the visible size of the virtual object is restricted. In the case of the second type the visible size of the virtual object need not be modified; alternatively, the visible size of the virtual object may be modified within a narrower range than in the first type. In moving the virtual object by a predetermined distance in the depth direction, the visible size of the virtual object may be modified, in the case of the second type, by an amount smaller than that in the first type. In the case of the second type, the visible size of the virtual object may be modified so that the virtual object looks smaller as it recedes away, until the depth position of the virtual object is the predetermined position, without modification of the visible size of the virtual object when the depth position lies further to the back than the predetermined position. In a case where the virtual object is for instance a text box containing characters, the smaller the visible size of the virtual object, the smaller and more difficult to read these characters become. Accordingly, characters can be prevented from becoming too small to read by classifying a character-containing virtual object as of the second type.

In a case where the visible size of the virtual object is smaller than the visible size of the specific object, the depth position of the virtual object may be controlled to a position further to the back than the specific object, regardless of whether the specific object is an easily movable object or not. In a case where the specific object is an easily movable object, the depth position of the virtual object may be controlled to a position lying further to the back than the specific object, regardless of whether the visible size of the virtual object is smaller than the visible size of the specific object or not.

It may also be possible to switch between displaying or not the virtual object in accordance with the method of the embodiments described above (method for controlling the depth position of the virtual object, and displaying the virtual object, so as not to elicit an awkward feeling in the user, while suppressing fatigue to the user), depending on the type of the virtual object. In a case for instance where an urgent virtual object is to be displayed, the virtual object may be displayed at all times close by (with a large parallax), without resorting to the method in the above embodiments.

The embodiments described above (including variations thereof) are merely illustrative in nature, and the present invention encompasses also configurations arrived at by modifying or altering as appropriate the features described above, within the scope of the gist of the present invention. The present invention encompasses also configurations arrived at by combining as appropriate features described above.

The present invention makes it possible to display a virtual object without eliciting an awkward feeling in a user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-017805, filed on Feb. 8, 2022, which is hereby incorporated by reference herein in its entirety.

What is claimed is:

1. A control device configured to control a display device so as to dispose a virtual object at a predetermined position in a three-dimensional space, through right-eye display and left-eye display, the control device comprising one or more processors and/or circuitry configured to:
   execute object detection processing of detecting an object present in a field of vision of a user, in the three-dimensional space; and execute distance detection processing of detecting a distance from the display device to the detected object, wherein a depth position of the virtual object is controlled by controlling a parallax of the virtual object between the right-eye display and the left-eye display, on a basis of a distance from the display device to a specific object that is present in a direction in which the virtual object is disposed, and that is an object closest to the display device, in a case where a visible size of the virtual object is larger than a visible size of the specific object, the depth position of the virtual object is controlled to a position at back of the specific object, and in a case where a visible size of the virtual object is smaller than a visible size of the specific object, the depth position of the virtual object is controlled to a position at front of the specific object.

2. The control device according to claim 1,
wherein a gaze direction of the user at a time where display of the virtual object is started is set as the direction in which the virtual object is disposed.

3. The control device according to claim 1,
wherein the display device is an optical see-through display.

4. The control device according to claim 1,
wherein the display device is a video see-through display.

5. The control device according to claim 1,
wherein the depth position of the virtual object is controlled in a case where a predetermined condition is satisfied, the predetermined condition including that an arrangement of an object in the direction in which the virtual object is disposed changes.

6. The control device according to claim 1,
wherein the depth position of the virtual object is controlled in a case where a predetermined condition is satisfied, the predetermined condition including that the gaze direction of the user points in the direction in which the virtual object is disposed.

7. The control device according to claim 1,
wherein the depth position of the virtual object is controlled to a position at front of the specific object, the position being based on the distance from the display device to the specific object.

8. The control device according to claim 1,
wherein the depth position of the virtual object is controlled to a position at front of the specific object by a predetermined distance.

9. The control device according to claim 1,
wherein the depth position of the virtual object is controlled to a position at front of the specific object by a distance that is obtained by reducing the distance from the display device to the specific object by a predetermined ratio.

10. The control device according to claim 1,
wherein the depth position of the virtual object is controlled on a basis of the distance from the display device to the specific object and a depth length of the virtual object.

11. The control device according to claim 10,
wherein the depth position of a frontmost surface of the virtual object is controlled to a position at front of a frontmost surface of the specific object, a distance between this position and the frontmost surface being the depth length of the virtual object.

12. The control device according to claim 1,
wherein the object is detected from a captured image.

13. The control device according to claim 1,
wherein in a case where the control controls the depth position of the virtual object to the position at back of the specific object, a region of the virtual object is not rendered, the region being a region overlapped by the specific object in the direction in which the virtual object is disposed.

14. The control device according to claim 1,
wherein in a case where the visible size of the virtual object is larger than the visible size of the specific object,
the depth position of the virtual object is controlled to a position at back of the specific object, if the specific object is a movable object; and
the depth position of the virtual object is controlled to a position at front of the specific object, if the specific object is an immovable object.

15. The control device according to claim 1,
wherein in a case where the specific object is a movable object, the depth position of the virtual object is controlled to a position at back of the specific object.

16. The control device according to claim 1,
wherein the depth position of the virtual object is controlled so as to change gradually to a target position.

17. A control method to control a display device so as to dispose a virtual object at a predetermined position in a three-dimensional space, through right-eye display and left-eye display, the control method comprising:
detecting an object present in a field of vision of a user, in the three-dimensional space; and
detecting a distance from the display device to the detected object; and
wherein a depth position of the virtual object is controlled by controlling a parallax of the virtual object between the right-eye display and the left-eye display, on a basis of a distance from the display device to a specific object that is present in a direction in which the virtual object is disposed, and that is an object closest to the display device,
in a case where a visible size of the virtual object is larger than a visible size of the specific object, the depth position of the virtual object is controlled to a position at back of the specific object, and
in a case where a visible size of the virtual object is smaller than a visible size of the specific object, the depth position of the virtual object is controlled to a position at front of the specific object.

18. A non-transitory computer readable medium that stores a program, wherein the program causes a computer to execute a control method to control a display device so as to dispose a virtual object at a predetermined position in a three-dimensional space, through right-eye display and left-eye display, the control method comprising:
detecting an object present in a field of vision of a user, in the three-dimensional space; and
detecting a distance from the display device to the detected object; and
wherein a depth position of the virtual object is controlled by controlling a parallax of the virtual object between the right-eye display and the left-eye display, on a basis of a distance from the display device to a specific object that is present in a direction in which the virtual object is disposed, and that is an object closest to the display device,
in a case where a visible size of the virtual object is larger than a visible size of the specific object, the depth position of the virtual object is controlled to a position at back of the specific object, and in a case where a visible size of the virtual object is smaller than a visible size of the specific object, the depth position of the virtual object is controlled to a position at front of the specific object.

* * * * *